United States Patent
Buradagunta et al.

(10) Patent No.: US 12,093,935 B2
(45) Date of Patent: Sep. 17, 2024

(54) METHOD AND SYSTEM OF INTEGRATING BLOCKCHAIN TECHNOLOGY WITH EXISTING COMPUTER ARCHITECTURE

(71) Applicant: MASTERCARD INTERNATIONAL INCORPORATED, Purchase, NY (US)

(72) Inventors: Sarala Buradagunta, West Orange, NJ (US); Ravi Kumar Cherukuru, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 140 days.

(21) Appl. No.: 17/554,525

(22) Filed: Dec. 17, 2021

(65) Prior Publication Data
US 2023/0196345 A1 Jun. 22, 2023

(51) Int. Cl.
*G06Q 20/38* (2012.01)
*G06Q 20/06* (2012.01)

(52) U.S. Cl.
CPC ....... *G06Q 20/3825* (2013.01); *G06Q 20/065* (2013.01); *G06Q 20/38215* (2013.01); *G06Q 20/3827* (2013.01)

(58) Field of Classification Search
CPC ............. G06Q 20/3825; G06Q 20/065; G06Q 20/38215; G06Q 20/3827; G06Q 20/223; G06Q 20/3678; G06Q 20/3829; G06Q 20/389; G06Q 20/401; G06Q 20/4016; G06Q 20/02
See application file for complete search history.

(56) References Cited

U.S. PATENT DOCUMENTS

| | | | |
|---|---|---|---|
| 10,762,506 B1 * | 9/2020 | Cash | G06Q 20/206 |
| 11,308,487 B1 * | 4/2022 | Foster | G06Q 20/3829 |
| 2019/0019169 A1 | 1/2019 | McLaughlin et al. | |
| 2020/0279259 A1 * | 9/2020 | Zhou | G06Q 20/3825 |
| 2021/0158317 A1 * | 5/2021 | Kurylko | G06Q 20/34 |

(Continued)

OTHER PUBLICATIONS

International Search Report and Written Opinion dated May 11, 2023, corresponding to PCT/US2022/051965 (13 Pages).

*Primary Examiner* — Patrick McAtee
*Assistant Examiner* — Vincent I Idiake
(74) *Attorney, Agent, or Firm* — Panitch Schwarze Belisario & Nadel LLP

(57) ABSTRACT

A method for enabling the use of blockchain smart contracts as part of a traditional payment transaction includes: receiving, by a receiver of a processing server, a transaction message for a payment transaction, wherein the transaction message is formatted according to one or more standards and includes a plurality of data elements storing transaction data, the transaction data including at least a bank identification value; determining, by a processor of the processing server, a routing plan for the transaction message based on at least the bank identification value; and transmitting, by a transmitter of the processing server, the transaction message to (i) a first computing system using a first communication port of the processing server, and (ii) a second computing system using a second communication port of the processing server, based on the determined routing plan.

12 Claims, 5 Drawing Sheets

(56) References Cited

U.S. PATENT DOCUMENTS

2023/0092175 A1* 3/2023 Yates ................... G06Q 20/24
                                                      705/14.36
2023/0098747 A1* 3/2023 Vijayaraghavan ... G06Q 50/182
                                                         705/69

* cited by examiner

METHOD AND SYSTEM OF INTEGRATING BLOCKCHAIN TECHNOLOGY WITH EXISTING COMPUTER ARCHITECTURE

FIELD

The present disclosure relates to integrating blockchain technology with existing computer architecture, specifically integrating blockchain with a traditional payment network enabling smart contracts to be executed using data from a formatted transaction message.

BACKGROUND

Consumers that are interested in conducting a payment transaction have a number of payment methods at their disposal, such as cash, check, debit card, or credit card. In recent years, consumers overwhelmingly prefer to use debit or credit cards because of the benefits they offer over the use of cash or check, such as consumer protections, analytics, spending controls, and loyalty and reward programs. Payment transactions that are funded using debit or credit cards are typically processed using a payment processor where data regarding the transactions themselves are included in transaction messages, comprised of specially formatted data messages that are transmitted along payment rails, which is specialized infrastructure used by the payment processor and inaccessible by other systems and entities. The use of specialized payment rails and infrastructure enables payment processors to both keep data private and secure as well as ensure that transactions are processed extremely quickly, well beyond what could be possible using generic Internet.

In recent years, blockchain technology has emerged as an alternative for conducting payment transactions, where a digital currency that is tracked and transferred using the blockchain can be used in place of a traditional fiat currency. Blockchains can also have additional functionality beyond the use of transferring digital currency that can be useful for various entities. In some cases, two parties may be interested in performing a traditional payment transaction using a payment processor, while also utilizing blockchain technology for a purpose related to the payment transaction. However, there are no existing systems that integrate blockchain technology with traditional payment processing architectures. Thus, there is a need for a technological solution to integrate traditional payment networks and payment rails with blockchain technology.

SUMMARY

The present disclosure provides a description of systems and methods for enabling the use of blockchain smart contracts as part of a traditional payment transaction. An integrated processor or central processor, as part of a traditional payment network architecture, can receive a specially formatted transaction message as part of the processing of a traditional payment transaction. The processor can identify data in the transaction message and determine a routing plan for the transaction, which can include utilizing functionality of a blockchain. The processor can forward the transaction message to an issuing financial institution using a first port of the processor, for traditional authorization processing, and to a blockchain node using a second port of the processor. The blockchain node can perform any necessary actions upon receipt of the transaction message, such as the execution of a smart contract stored on a blockchain using data from the transaction message. The result is that two entities involved in a traditional payment transaction can take advantage of blockchain functionality while using existing payment processing architecture without any modifications to most systems involved in transaction processing, which thereby provides a significant technological improvement with minimal disruption to standard processes.

A method for enabling the use of blockchain smart contracts as part of a traditional payment transaction includes: receiving, by a receiver of a processing server, a transaction message for a payment transaction, wherein the transaction message is formatted according to one or more standards and includes a plurality of data elements storing transaction data, the transaction data including at least a bank identification value; determining, by a processor of the processing server, a routing plan for the transaction message based on at least the bank identification value; and transmitting, by a transmitter of the processing server, the transaction message to (i) a first computing system using a first communication port of the processing server, and (ii) a second computing system using a second communication port of the processing server, based on the determined routing plan.

A system for enabling the use of blockchain smart contracts as part of a traditional payment transaction includes: a first computing system; a second computing system; and a processing server, the processing server including a receiver receiving a transaction message for a payment transaction, wherein the transaction message is formatted according to one or more standards and includes a plurality of data elements storing transaction data, the transaction data including at least a bank identification value, a processor determining a routing plan for the transaction message based on at least the bank identification value, and a transmitter transmitting the transaction message to (i) the first computing system using a first communication port of the processing server, and (ii) the second computing system using a second communication port of the processing server, based on the determined routing plan.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Integrating Blockchain with Payment Processing Architecture

Figure 1:
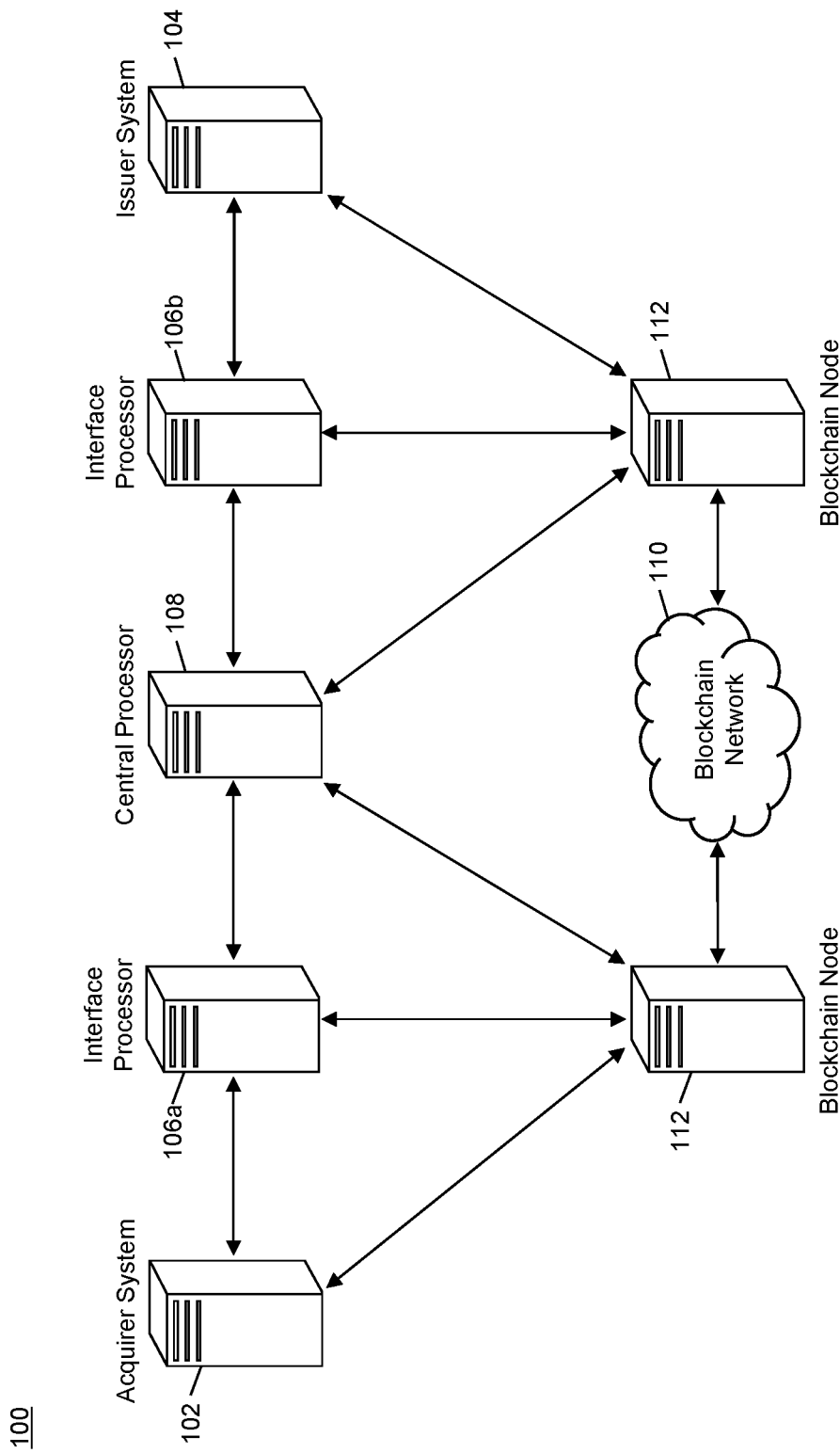
FIG. 1 is a block diagram illustrating a high-level system architecture for enabling the use of blockchain smart contracts in a traditional payment transaction in accordance with exemplary embodiments.

FIG. 1 illustrates a system 100 for integrating blockchain technology with traditional payment processing architecture and infrastructure to enable blockchain features, such as smart contracts, to be used as part of a traditional payment transaction.

Traditionally, a payment transaction is processed by a payment network. As discussed herein, the term "payment network" can refer to a system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

As discussed herein, the term "payment transaction" can refer to a transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing. A "transaction account" can refer to a financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

The system 100 illustrated in FIG. 1 depicts the systems for an acquirer and issues involved in a payment transaction, illustrated as the acquirer system 102 and issuer system 104. As used herein, the term "acquirer" can refer to an entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer. As used herein, the term "issuer" can refer to an entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

In a traditional payment transaction as processed in the system 100, an acquirer system 102 may receive transaction details for a payment transaction from a merchant point of sale system or other suitable source. In some cases, the transaction details may be formatted in a transaction message by the merchant point of sale system prior to transmission to the acquirer system 102. In other cases, the transaction details may be transmitted to the acquirer system 102 in a different format, where the acquirer system 102 can be configured to generate a transaction message for the payment transaction. A transaction message may be a specially formatted data message that is formatted according to one or more standards governing the exchange of financial transaction message, which can be specified by the payment network through which the payment transaction is processed. Such standards may include, for example, the International Organization of Standardization's ISO 8583 or ISO 20022 standards. A transaction message may include a plurality of data elements, where each data element is configured to store data as specified in the applicable standard(s). For example, one data element may be configured to store an account number of the transaction account being used to fund the payment transaction, while another data element may be configured to store a timestamp, and another element can be configured to store a merchant identification value. A transaction message can also include a message type indicator, which can be an indication of a type for the transaction message. For instance, the message type indicator of the transaction message received or generated by the acquirer system 102 may indicate that the transaction message is an authorization request.

Once the acquirer system 102 has obtained or generated the transaction message, the transaction message can be electronically transmitted to an interface processor 106. An interface processor 106 can be a physical computing device that is connected to an acquirer system 102 or an issuer system 104 and used to connect outside systems to a payment network, where a payment network may provide interface processors 106 at locations for all acquirers and issuers that have transactions processed via the payment network. In many cases, an interface processor 106 is a closed system that is inaccessible by unauthorized entities. In such cases, only authorized personnel, typically employed or otherwise contracted by the payment network itself, can access an interface processor 106, both physically or through software or other means. The acquirer system 102 electronically transmits a transaction message for a new payment transaction to its local interface processor 106a using a suitable communication network and method. The interface processor 106a then performs and necessary actions regarding the transaction message (e.g., stand-in processing, value added services, fraud detection, etc.) before transmitting the transaction message to a central processor 108 using payment rails, where payment rails are specialized network infrastructure of the payment network that are only accessible using authorized devices (e.g., interface processors 106 and central processors 108).

The central processor 108 can receive the transaction message from the interface processor 106a and analyze data included in the data elements thereof to determine a routing plan for the transaction message. In a traditional payment transaction, the central processor 108 may identify a value stored in a data element configured to store a transaction account number for the transaction account used to fund the payment transaction (e.g., read from a debit or credit card by the merchant), where a portion of the transaction account number may comprise a bank identification number. The central processor 108 can use the bank identification number to identify the issuer system 104 associated with the financial institution that issued the transaction account for routing of the transaction message. The central processor 108 can then forward the transaction message to an appropriate interface processor 106b in the payment network, using the payment rails, that is in communication with the issuer system 104. In many cases, the central processor 108 can be configured to perform additional services or functions utilizing the transaction message prior to forwarding, such as applying transaction controls, performing fraud detection, enacting consumer protection measures, etc.

The interface processor 106b can receive the transaction message from the central processor 108 and then forward the transaction message to the issuer system 104 using a suitable communication network and method, such as a local area network, radio frequency network, the Internet, etc. The issuer system 104 can receive the transaction message and determine if the corresponding payment transaction should be approved or denied using traditional methods, such as by ensuring that the credit limit or balance on the transaction account is sufficient to cover the cost of the payment transaction as indicated in a data element configured to store a transaction amount. The issuer system 104 can generate an authorization response for the payment transaction, where the authorization response can be a new transaction message or a modification of the received authorization request that includes a message type indicator indicative of an authorization response and also includes a data element configured to store a response code indicating approval or decline of the payment transaction and, in some cases, a reason for the decline, if applicable.

The issuer system 104 can transmit the authorization response to the interface processor 106b, which can forward the authorization response to the central processor 108 using the payment rails. The central processor 108 can perform any necessary functionality (e.g., updating values for transaction controls, recording data for compliance, etc.) and then forward the authorization response to the interface processor 106a using the payment rails. The interface processor 106a can then electronically transmit the authorization response to the acquirer system 102 using a suitable communication network and method. The acquirer system 102 can identify if the payment transaction was approved or declined using the authorization response and notify its merchant accordingly to finalize the payment transaction (e.g., provided purchased goods or services to a consumer if approved). The acquirer system 102 can then credit the transaction account for the merchant used to receive funds in the payment transaction (e.g., as identified in an appropriate data element in the transaction message) accordingly.

In the system 100, one of the entities involved in a payment transaction that is to be processed using the payment network can be interested in taking advantage of functionality offered by a blockchain, such as a smart contract. A smart contract can be a self-executable function that executes using supplied data and performs one or more actions as a result. For instance, a smart contract can be supplied with transaction data for a payment transaction and, if the transaction data complies with an expectation, submit an instruction for transfer of ownership of an item to another system or record a transfer on the blockchain. In an example, two parties may conduct a transaction for a sale of property with a deed for the property being stored on a blockchain, where a smart contract is used to transfer the deed to the buying party on the blockchain if a traditional payment transaction for the sale is positively verified.

Figure 2:
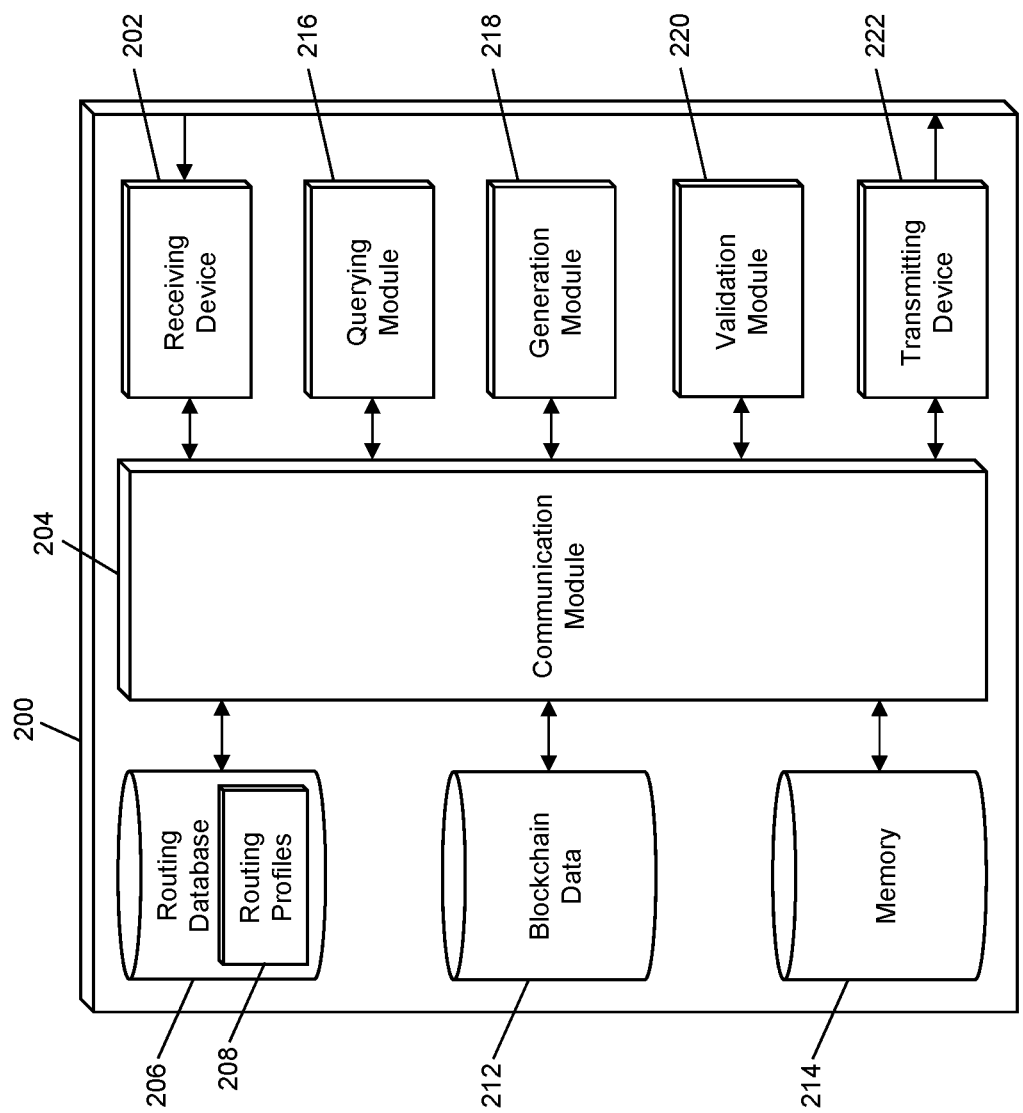
FIG. 2 is a block diagram illustrating a computing device for enabling the use of blockchain smart contracts in a traditional payment transaction in accordance with exemplary embodiments.
Figure 5:
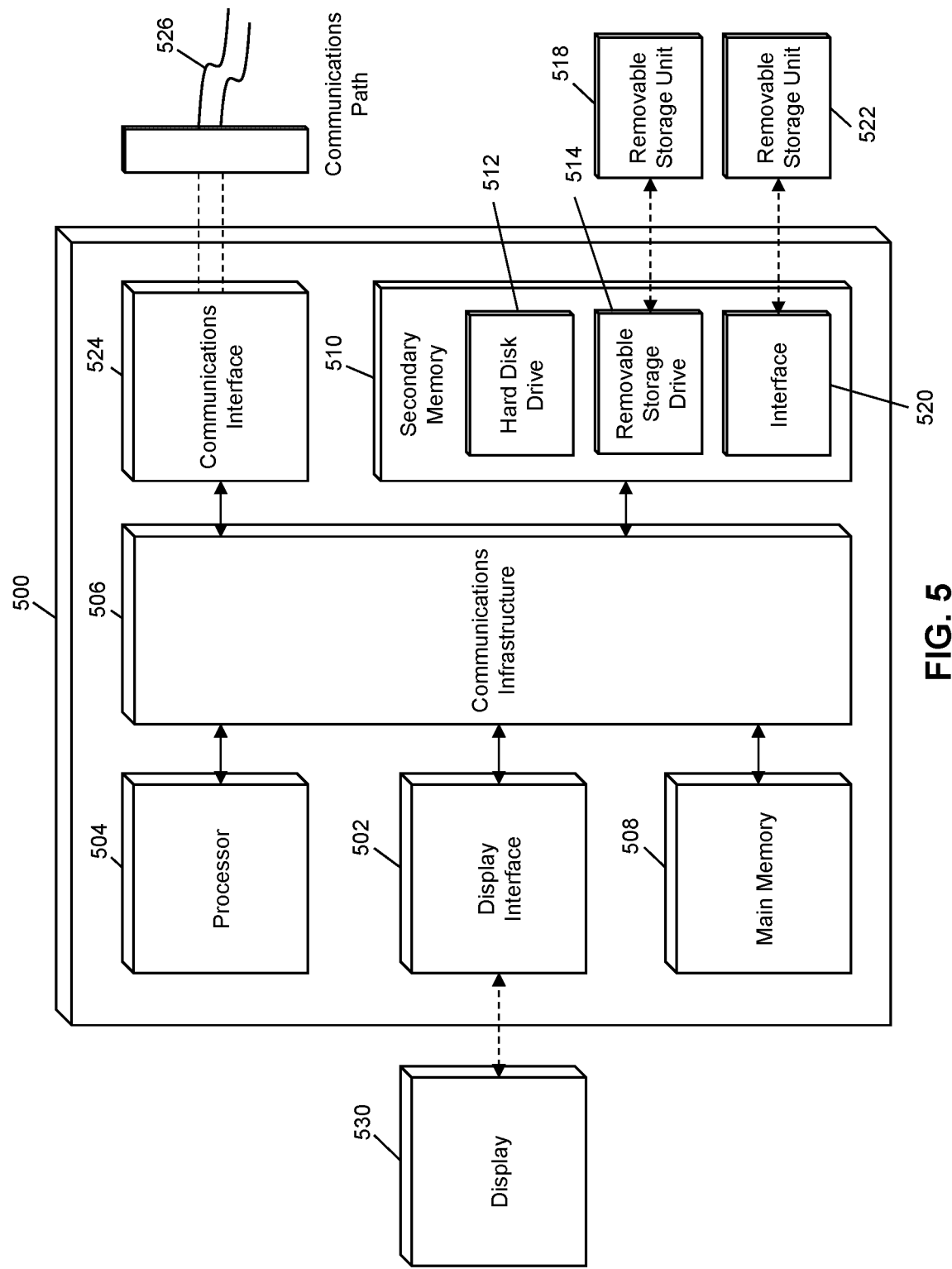
FIG. 5 is a block diagram illustrating a computer system architecture in accordance with exemplary embodiments.

To take advantage of such functionality, the system 100 can include a blockchain network 110. The blockchain network 110 can be comprised of a plurality of blockchain nodes 112. Each blockchain node 112 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 112 in the blockchain network 110 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 110 using the public key of the cryptographic key pair. In some cases, the term "blockchain wallet" can refer specifically to the private key. In other cases, the term "blockchain wallet" can refer to a computing device (e.g., acquirer system 102, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., an issuer system 104) that is generated using the sender's private key, a blockchain address of the recipient of currency (e.g., an acquirer system 102) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 112 in the blockchain network 110, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 110 before being added to the blockchain and distributed to all of the blockchain nodes 112 in the blockchain network 110, respectively, in traditional blockchain implementations. In cases where a blockchain data value cannot be related to a blockchain transaction, but instead the storage of other types of data, blockchain data values can still include or otherwise involve the validation of a digital signature.

In the system 100, a transaction message can be sent to a blockchain node 112 in the blockchain network 110. In some embodiments, an interface processor 106, either the interface processors 106a or 106b, can electronically transmit the transaction message to a blockchain node 112. In some such embodiments, an interface processor 106 can have two communication ports, where a first communication port is connected to the payment rails of the payment network for communicating with the central processor 108, and where a second communication port is connected to a different communication network (e.g., the Internet) for communicating with a blockchain node 112. In some cases, the communication ports may use different communication protocols or other technologies. In other embodiments, the central processor 108 can electronically transmit the transaction message to the blockchain node 112. In some such embodiments, the central processor 108 may similarly have multiple communication ports, such as communication ports configured to communicate with interface processors 106 using payment rails and a communication port configured to communicate with another communication network (e.g., the Internet) with one or more blockchain nodes 112. In some embodiments, the acquirer system 102 and/or issuer system 104 can be configured to electronically transmit transaction messages to blockchain nodes 112 using a suitable communication network and method.

In some cases, transaction messages electronically transmitted to blockchain nodes 112 may be authorization responses. In other cases, authorization requests can be electronically transmitted to blockchain nodes 112. In some instances, an issuer system 104 can be required to provide explicit approval for the forwarding of a transaction message involving a payment account associated with the issuer to a blockchain node 112. In some instances, an authorization response indicating approval of the payment transaction may be sufficient for approval. In other instances, the interface processor 106b may electronically transmit a request message to the issuer system 104 requesting approval and can only transmit a transaction message to a blockchain node 112 after receiving a return message indicating approval from the issuer system 104.

In some embodiments, the central processor 108 or an interface processor 106 can determine a routing plan for a received transaction message that includes transmitting of a copy of the transaction message to a blockchain node 112 prior to making such a transmission. In such embodiments, the determination may be based on a bank identification number included in an appropriate data element included in the transaction message or other value stored in a suitable data element, such as a data element reserved for private use. For example, a data element reserved for private use can be used to store a flag value that can be used by an interface processor 106*a* or central processor 108 to determine if the transaction message is to be transmitted to a blockchain node 112. In some instances, the issuer system 104 may provide an instruction to an interface processor 106 or central processor 108 regarding the transmission of a transaction message to a blockchain node 112, such as may be included in an authorization response or separate message.

Once a blockchain node 112 receives a transaction message, the blockchain node 112 can identify a blockchain data entry stored in the blockchain or data included therein that is associated with the transaction message. In some cases, the transaction message may include a value stored in a data element reserved for private use that can be used by the blockchain node 112 to identify the blockchain data entry or data included therein. For example, a smart contract stored in a blockchain data entry in the blockchain can be assigned a unique identifier, or the blockchain data entry that includes the smart contract can be assigned a unique identifier, where the unique identifier can be included in a data element stored in the transaction message. In such an example, the blockchain node 112 can identify the blockchain data entry or smart contract using the unique identifier.

The blockchain node 112 can then execute an identified smart contract or perform other functionality (e.g., verify and perform a new blockchain transaction). In some cases, a smart contract may require input data that can be parsed from the received transaction message. In such cases, the blockchain node 112 can parse the appropriate data from the transaction message (e.g., identified via the applicable standard(s) and the data elements in the transaction message) and supply the identified data as inputs to the smart contract. In other cases, the transaction message itself may be used as input to a smart contract, where the smart contract may identify necessary data in the transaction message itself. The smart contract can then self-execute and perform any necessary functions as designed by the contract.

In some embodiments, the system 100 may be implemented with the interface processors 106*a* and 106*b* combined into a single interface processor 106. In some embodiments, the central processor 108 may be configured to perform the functions of an interface processor 106 as discussed herein. In some embodiments, one or more interface processors 106 can be configured to perform the functions of a central processor 108. In some embodiments, the acquirer system 102 and/or issuer system 104 can be blockchain nodes 112 in the blockchain network 110. In some embodiments, interface processors 106 can be blockchain nodes 112 in the blockchain network 110. In such embodiments, one or more components illustrated in the system 100 can be configured to perform the functions of other components in the system 100, as applicable.

The methods and systems discussed herein enable a traditional payment transaction to take advantage of functionality of a blockchain, such as smart contracts. By having a transaction message transmitted to a blockchain node 112 during the processing of the associated payment transaction, blockchain functionality can be introduced without affecting the processing of the payment transaction using traditional payment network architecture and infrastructure or requiring any modifications to acquirer systems 102 or issuer systems 104. For instance, by utilizing a new communication port on an interface processor 106, the use of blockchain functionality can be introduced for a traditional payment transaction without affecting the processing of the traditional payment transaction and while maintaining the separation and security of payment rails of the payment network. The result is a broadening of services available to customers of a payment network with minimal change to processors and systems with which the customers are already familiar, providing for a significant technological improvement to existing systems.

Computing Device

FIG. 2 illustrates an embodiment of a computing device 200. It will be apparent to persons having skill in the relevant art that the embodiment of the computing device 200 illustrated in FIG. 2 is provided as illustration only and cannot be exhaustive to all possible configurations of the computing device 200 suitable for performing the functions as discussed herein. For example, the computer system 500 illustrated in FIG. 5 and discussed in more detail below can be a suitable configuration of the computing device 200. The computing device 200 can be configured to serve as one or more components of the system 100, including the acquirer system 102, issuer system 104, interface processors 106, central processor 108, and blockchain nodes 112.

The computing device 200 can include a receiving device 202. The receiving device 202 can be configured to receive data over one or more networks via one or more network protocols. In some instances, the receiving device 202 can be configured to receive data from acquirer systems 102, issuer systems 104, interface processors 106, central processors 108, blockchain nodes 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by acquirer systems 102 that are superimposed or otherwise encoded with transaction messages including authorization request messages. The receiving device 202 can also be configured to receive data signals electronically transmitted by issuer systems 104, which are superimposed or otherwise encoded with transaction messages including authorization response messages, response messages indicating approval of blockchain transfers, and instructions regarding blockchain transfers. The receiving device 202 can be further configured to receive data signals electronically transmitted by interface processors 106 and/or central processors 108 that are superimposed or otherwise encoded with transaction messages, which can include authorization requests and authorization responses. The receiving device 202 can also be configured to receive data signals electronically transmitted by blockchain nodes 112, which can be superimposed or otherwise encoded with blockchain data, new blocks, blockchain data values, confirmation messages, etc.

The computing device 200 can also include a communication module 204. The communication module 204 can be configured to transmit data between modules, engines, databases, memories, and other components of the computing device 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 200 and external components of the computing device 200, such as externally connected databases, display devices, input devices, etc. The computing device 200 can also include a processing device. The processing device can be configured to perform the functions of the computing device 200 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing device 200 can include a routing database 206. The routing database 206 can be configured to store a plurality of routing profiles 208 using a suitable data storage format and schema. The routing database 206 can be a relational database that utilizes structured query language for the storage, identification, modifying, updating, accessing, etc. of structured data sets stored therein. Each routing profile 208 can be a structured data set configured to store data related to the routing of transaction messages. For example, a routing profile 208 can include a bank identification number or other value stored in a data element in a transaction message and other information regarding where to route transaction messages that include such a value, such as communication addresses (e.g., for issuer systems 104, acquirer systems 102, interface processors 106, etc.). A routing profile 208 can also include rules or criteria for the transmission of a transaction message to a blockchain node 112.

The computing device 200 may also include blockchain data 212, which may be stored in the memory 214 of the computing device 200 or stored in a separate area within the computing device 200 or accessible thereby. The blockchain data 212 may include a blockchain, which may be comprised of a plurality of blocks and be associated with the blockchain network 110. In some cases, the blockchain data 212 may further include any other data associated with the blockchain and management and performance thereof, such as block generation algorithms, digital signature generation and confirmation algorithms, communication data for blockchain nodes 112, etc.

The computing device 200 can also include a memory 214. The memory 214 can be configured to store data for use by the computing device 200 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing device 200 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, communication information, data formatting rules, blockchain data, signature generation algorithms, transaction message standards, etc.

The computing device 200 can include a querying module 216. The querying module 216 can be configured to execute queries on databases to identify information. The querying module 216 can receive one or more data values or query strings and can execute a query string based thereon on an indicated database, such as the memory 214 of the computing device 200 to identify information stored therein. The querying module 216 can then output the identified information to an appropriate engine or module of the computing device 200 as necessary. The querying module 216 can, for example, execute a query on the routing database 206 to identify a routing profile 208 for a received transaction message for use in determining a routing plan for the transaction message.

The computing device 200 can also include a generation module 218. The generation module 218 can be configured to generate data for use by the computing device 200 in performing the functions discussed herein. The generation module 218 can receive instructions as input, can generate data based on the instructions, and can output the generated data to one or more modules of the computing device 200. For example, the generation module 218 can be configured to generate notification messages, confirmation messages, digital signatures, blockchain data values, blocks, routing profiles, transaction messages, unique identifiers, etc.

The computing device 200 can also include a validation module 220. The validation module 220 can be configured to perform validations for the computing device 200 as part of the functions discussed herein. The validation module 220 can receive instructions as input, which can also include data to be used in performing a validation, can perform a validation as requested, and can output a result of the validation to another module or engine of the computing device 200. The validation module 220 can, for example, be configured to validate digital signatures using suitable signature generation algorithms and keys, validate data objects and/or data included therein, validate transaction messages for authorization, validate values stored in data elements of a transaction message, etc.

The computing device 200 can also include a transmitting device 222. The transmitting device 222 can be configured to transmit data over one or more networks via one or more network protocols. In some instances, the transmitting device 222 can be configured to transmit data to acquirer systems 102, issuer systems 104, interface processors 106, central processors 108, blockchain nodes 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to acquirer devices 102 that are superimposed or otherwise encoded with transaction messages, such as authorization response messages for an authorized or denied payment transaction. The transmitting device 222 can also be configured to electronically transmit data signals to issuer systems 104, which are superimposed or otherwise encoded with transaction messages including authorization request messages, requests for approval of a blockchain transfer, etc. The transmitting device 222 can be further configured to electronically transmit data signals to interface processors 106 and/or central processors 108 that are superimposed or otherwise encoded with transaction messages, including authorization request and authorization response messages, response messages indicating approval or denial of a blockchain transfer, etc. The transmitting device 222 can also be configured to electronically transmit data signals to blockchain nodes 112, which are superimposed or otherwise encoded with transaction messages, blockchain data, blockchain data values, new blocks, confirmation messages, response messages, etc.

Process for Executing a Smart Contract on a Payment Transaction

Figure 3:
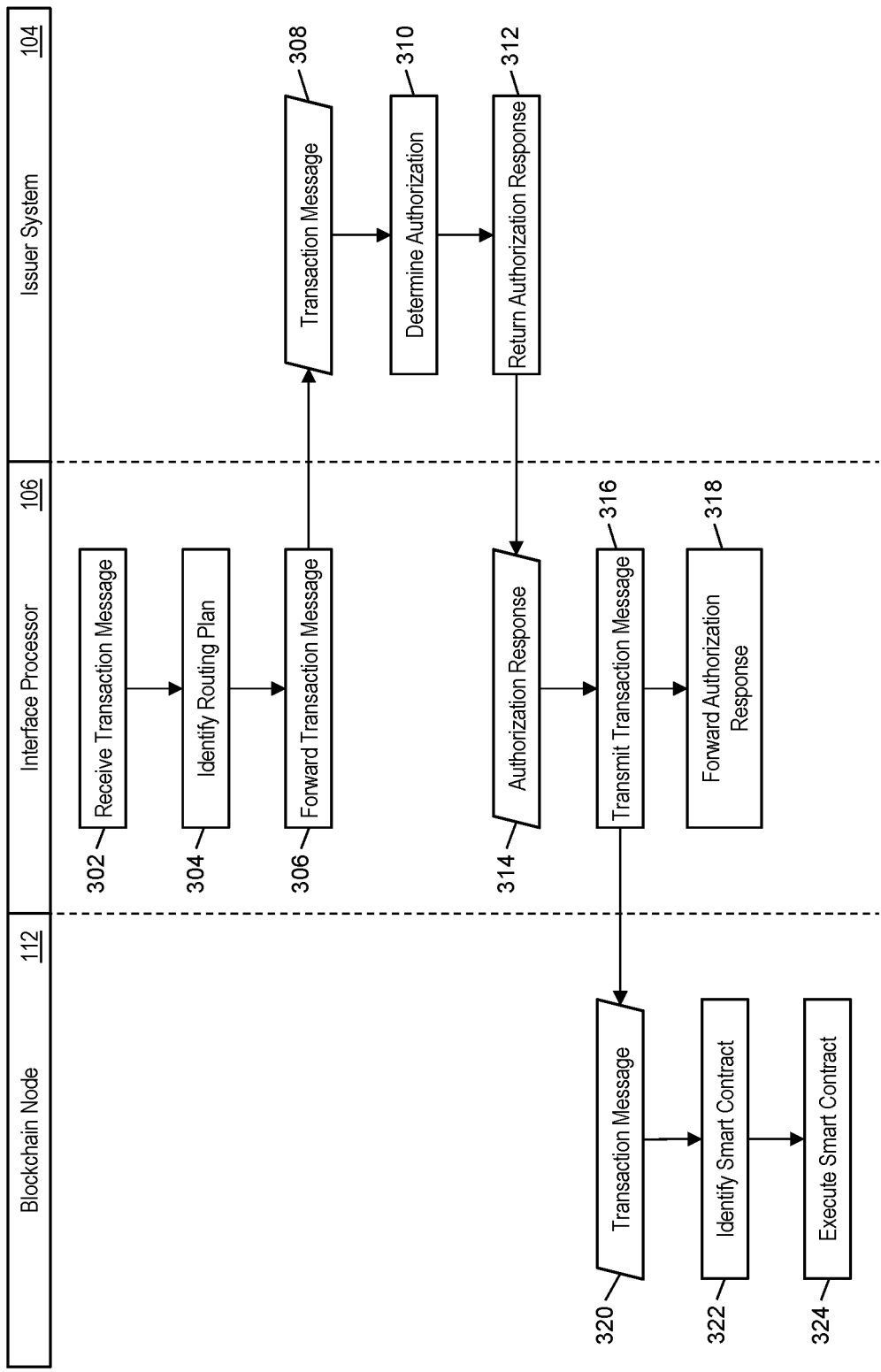
FIG. 3 is a flow diagram illustrating a process for enabling the use of blockchain smart contracts in a traditional payment transaction in the system of FIG. 1 in accordance with exemplary embodiments.

FIG. 3 illustrates a process for executing a smart contract stored on a blockchain as part of the processing of a traditional payment transaction through integration of blockchain technology with payment processing architecture in the system 100 of FIG. 1.

In step 302, a receiving device 202 of an interface processor 106 can receive a transaction message for a payment transaction via payment rails. The transaction message can be an authorization request message (e.g., indicated in a message type indicator in the transaction message) that is specially formatted according to one or more standards governing the exchange of financial transaction message. The transaction message can include a plurality of data elements configured to store data as indicated in the applicable standard(s), where the plurality of data elements store transaction data for the payment transaction including at least a bank identification value. In step 304, a generation module 218 of the interface processor 106 can generate routing plan for the transaction message based on at least the bank identification value. For instance, a querying module 216 of the interface processor 106 can execute a query on a routing database 206 of the interface processor to identify a routing profile 208 stored therein that includes the bank identification value, where the generation module 218 can generate the routing plan based on data included in the routing profile 208.

In step 306, a transmitting device 222 of the interface processor 106 can forward the transaction message to an issuer system 104 as based on the routing plan, where the transaction message can be forwarded using a first communication port of the interface processor 106. In step 308, a receiving device 202 of the issuer system 104 can receive the transaction message from the interface processor 106. In 310, a validation module 220 of the issuer system 104 can determine approval or denial of the payment transaction based on data included in the transaction message, such as by identifying a transaction account using an account number stored in a corresponding data element in the transaction message and determining if a balance or credit limit for the transaction account is suitable to cover a transaction amount for the payment transaction as stored in another corresponding data element in the transaction message. Once authorization is approved, the generation module 218 of the issuer system 104 can generate an authorization response, which can be a modified version of the authorization request or a new transaction message that includes a message type indicator indicative of an authorization response as well as a data element that stores a response code that indicates approval of the payment transaction.

In step 312, a transmitting device 222 of the issuer system 104 can electronically transmit the authorization response message to the interface processor 106. In step 314, the receiving device 202 of the interface processor 106 can receive the authorization response. In step 316, the transmitting device 222 of the interface processor 106 can electronically transmit a transaction message (e.g., the authorization request received in step 302 or the authorization response received in step 314) to a blockchain node 112, where the transaction message can be transmitted using a second communication port of the interface processor 106. In step 318, the transmitting device 222 of the interface processor 106 can forward the authorization response to an acquirer system 102 for use in finalizing the associated payment transaction.

In step 320, a receiving device 202 of the blockchain node 112 can receive the transaction message from the interface processor 106. In step 322, a querying module 216 of the blockchain node 112 can identify a smart contract that is stored in a blockchain data value in the blockchain of the blockchain network 110 that comprises the blockchain node 112, such as may be stored locally in blockchain data 212 in the blockchain node 112. In some instances, the smart contract can be identified using a value stored in a data element reserved for private use that is included in the received transaction message. In step 324, the blockchain node 112 may use the transaction message or data included therein as input and execute the smart contract on the blockchain, which can result in one or more actions performed as programmed in the smart contract.

Exemplary Method for Integrating Blockchain with Payment Network Architecture

Figure 4:
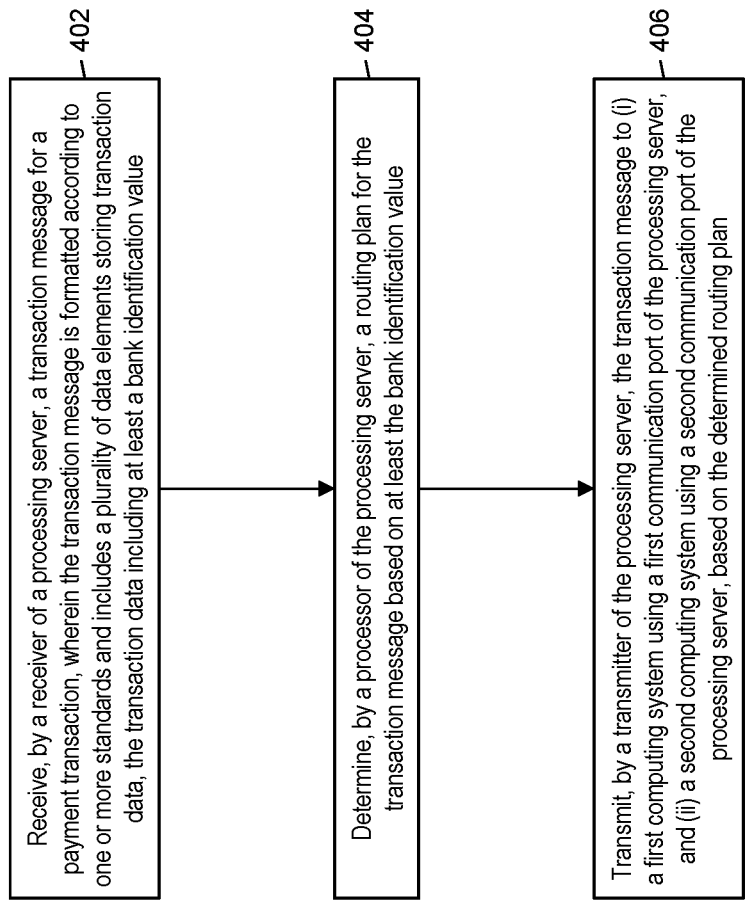
FIG. 4 is a flow chart illustrating an exemplary method for enabling the use of blockchain smart contracts in a traditional payment transaction in accordance with exemplary embodiments.

FIG. 4 illustrates a method 400 for integrating blockchain technology with architecture of a payment network through enabling the use of a blockchain smart contract as part of a traditional payment transaction.

In step 402, a transaction message for a payment transaction can be received by a receiver (e.g., receiving device 202) of a processing server (e.g., acquirer system 102, issuer system 104, interface processor 106, central processor 108), wherein the transaction message is formatted according to one or more standards and includes a plurality of data elements storing transaction data, the transaction data including at least a bank identification value. In step 404, a routing plan for the transaction message can be determined by a processor (e.g., generation module 218) of the processing server based on at least the bank identification value. In step 406, the transaction message can be transmitted by a transmitter (e.g., transmitting device 222) of the processing server to (i) a first computing system (e.g., issuer system 104, interface processor 106, central processor 108) using a first communication port of the processing server, and (ii) a second computing system (e.g., blockchain node 112) using a second communication port of the processing server, based on the determined routing plan.

In one embodiment, the transaction message transmitted using the first communication port can use a first communication network and protocol, and the transaction message transmitted using the second communication port can use a second communication network and protocol. In some embodiments, the first computing system can be associated with a financial institution. In one embodiment, the plurality of data elements can include a data element reserved for private use storing a routing value, and the routing plan can be further determined based on the routing value. In some embodiments, the method 400 can further include receiving, by the receiver of the processing server, a confirmation message from the first computing system indicating approval of the payment transaction, wherein the confirmation is received prior to transmitting the transaction message to the second computing system.

In one embodiment, the second computing system can be a blockchain node in a blockchain network (e.g., blockchain network 110). In a further embodiment, the method 400 can also include: identifying, by a processor (e.g., querying module 216) of the second computing system, a smart contract stored on a blockchain associated with the blockchain network based on at least the transaction data; and executing, by the processor of the second computing system, the identified smart contract using one or more values included in the transaction data as input for the smart contract. In an even further embodiment, the plurality of data elements can include a data element reserved for private use storing a unique identification value, and the smart contract can be identified using the unique identification value.

Computer System Architecture

FIG. 5 illustrates a computer system 500 in which embodiments of the present disclosure, or portions thereof, can be implemented as computer-readable code. For example, the acquirer system 102, issuer system 104, interface processors 106, central processor 108, and blockchain nodes 112 of FIG. 1 and the computing device 200 of FIG. 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for enabling the use of blockchain smart contracts as part of a traditional payment transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for enabling the use of blockchain smart contracts as part of a traditional payment transaction, comprising:
receiving, by a receiver of a processing server, a transaction message for a payment transaction with a merchant, from an acquirer associated with the merchant, wherein the transaction message includes a plurality of data elements storing transaction data, the transaction data including at least a bank identification value, wherein said processing server includes
a first communication port that is connected to payment rails of a payment network and is configured to communicate with a first computing system,
a second communication port that is connected to a network different from the payment network and is configured to communicate with a second computing system;
determining, by a processor of the processing server, a routing plan for the transaction message based on at least the bank identification value and information included in a routing database of the processing server; and
transmitting, by a transmitter of the processing server, the transaction message to both (i) the first computing system via the first communication port, of the processing server, that is connected to payment rails of the payment network, and (ii) the second computing system via the second communication port, of the processing server, that is connected to the network different from the payment network, based on the determined routing plan, wherein the first computing system is the issuer system, and the second computing system is a blockchain node.

2. The method of claim 1, wherein
the transaction message transmitted using the first communication port uses a first protocol, and
the transaction message transmitted using the second communication port uses a second protocol.

3. The method of claim 1, further comprising:
identifying, by a processor of the second computing system, a smart contract stored on a blockchain associated with the blockchain network based on at least the transaction data; and executing, by the processor of the second computing system, the identified smart contract using one or more values included in the transaction data as input for the smart contract.

4. The method of claim 3, wherein
the plurality of data elements includes a data element reserved for private use storing a unique identification value, and
the smart contract is identified using the unique identification value.

5. The method of claim 1, wherein
the plurality of data elements includes a data element reserved for private use storing a routing value, and
the routing plan is further determined based on the routing value.

6. The method of claim 1, further comprising:
receiving, by the receiver of the processing server, a confirmation message from the first computing system indicating approval of the payment transaction, wherein the confirmation is received prior to transmitting the transaction message to the second computing system.

7. A system for enabling the use of blockchain smart contracts as part of a traditional payment transaction, comprising:
a first computing system;
a second computing system; and
a processing server, the processing server including
a first communication port that is connected to payment rails of a payment network and is configured to communicate with the first computing system,
a second communication port that is connected to a network different from the payment network and is configured to communicate with the second computing system,
a receiver receiving, from an acquirer associated with a merchant, a transaction message for a payment transaction with the merchant, wherein the transaction message includes a plurality of data elements storing transaction data, the transaction data including at least a bank identification value,
a processor determining a routing plan for the transaction message based on at least the bank identification value and information included in a routing database of the processing server, and
a transmitter transmitting the transaction message to both (i) the first computing system via the first communication port, of the processing server, that is connected to payment rails of the payment network, and (ii) the second computing system via the second communication port, of the processing server, that is connected to the network different from the payment network, based on the determined routing plan, wherein the first computing system is the issuer system, and the second computing system is a blockchain node.

8. The system of claim 7, wherein
the transaction message transmitted using the first communication port uses a first protocol, and
the transaction message transmitted using the second communication port uses a second protocol.

9. The system of claim 7, wherein the second computing system includes a processor that
identifies a smart contract stored on a blockchain associated with the blockchain network based on at least the transaction data, and
executes the identified smart contract using one or more values included in the transaction data as input for the smart contract.

10. The system of claim 9, wherein
the plurality of data elements includes a data element reserved for private use storing a unique identification value, and
the smart contract is identified using the unique identification value.

11. The system of claim 7, wherein
the plurality of data elements includes a data element reserved for private use storing a routing value, and
the routing plan is further determined based on the routing value.

12. The system of claim 7, wherein the receiver of the processing server further receives a confirmation message from the first computing system indicating approval of the payment transaction, wherein the confirmation is received prior to transmitting the transaction message to the second computing system.

* * * * *